United States Patent [19]

Laures et al.

[11] Patent Number: 4,491,805
[45] Date of Patent: Jan. 1, 1985

[54] BPSK AND QPSK TRANSMISSION SYSTEMS HAVING PHASE LOCKED LOOP FOR REGENERATING THE CARRIER WAVE

[76] Inventors: Antoine Laures, 16, rue d'Arcueil, F-92120 Montrouge; Léon Horbacio, 10, rue Edouard Belin, F-78340 Clayes-sous-Bois, both of France

[21] Appl. No.: 356,799

[22] Filed: Mar. 10, 1982

[30] Foreign Application Priority Data

Mar. 27, 1981 [FR] France ............................... 81 06580

[51] Int. Cl.³ .............................................. H03L 7/08
[52] U.S. Cl. ......................................... 331/18; 331/23; 331/25
[58] Field of Search ..................... 329/50, 122; 331/18, 331/23, 25; 455/260

[56] References Cited

U.S. PATENT DOCUMENTS 4,292,594  9/1981  David et al. ........................... 329/50

FOREIGN PATENT DOCUMENTS 2367387  5/1978  France .
2434517  3/1980  France .
55-0138951  10/1980  Japan ................................... 455/260

Primary Examiner—Eugene R. LaRoche
Assistant Examiner—Robert J. Pascal
Attorney, Agent, or Firm—Laff, Whitesel, Conte & Saret

[57] ABSTRACT

The invention relates to a device for regenerating a carrier wave from a BPSK or QPSK modulation signal. The device multiplies the received signal by two or four depending on whether it has a BPSK or QPSK modulation. The multiplication delivers a reference signal. The device also has a locked loop comprising a voltage-controlled oscillator. A frequency divider is connected between the oscillator output and a second input of a comparator, the output of which is connected to the control input of the oscillator. The central frequency of the oscillator is equal to three times the nominal frequency $f_o$ of the received modulated signal. The output of the oscillator is connected to one input of a mixer having another input which receives the reference signal and the output of which is connected to the first input of the phase comparator. The frequency divider divides by three to deliver the regenerated carrier wave. Identical band-pass filters have a central frequency equal to $f_o$ and are disposed between (a) the output of the mixer and the first input of the phase comparator and (b) between the output of the divider by three and the second input of the phase comparator.

8 Claims, 4 Drawing Figures

CARRIER WAVE REGENERATING DEVICE WITH PHASE LOCKED LOOP

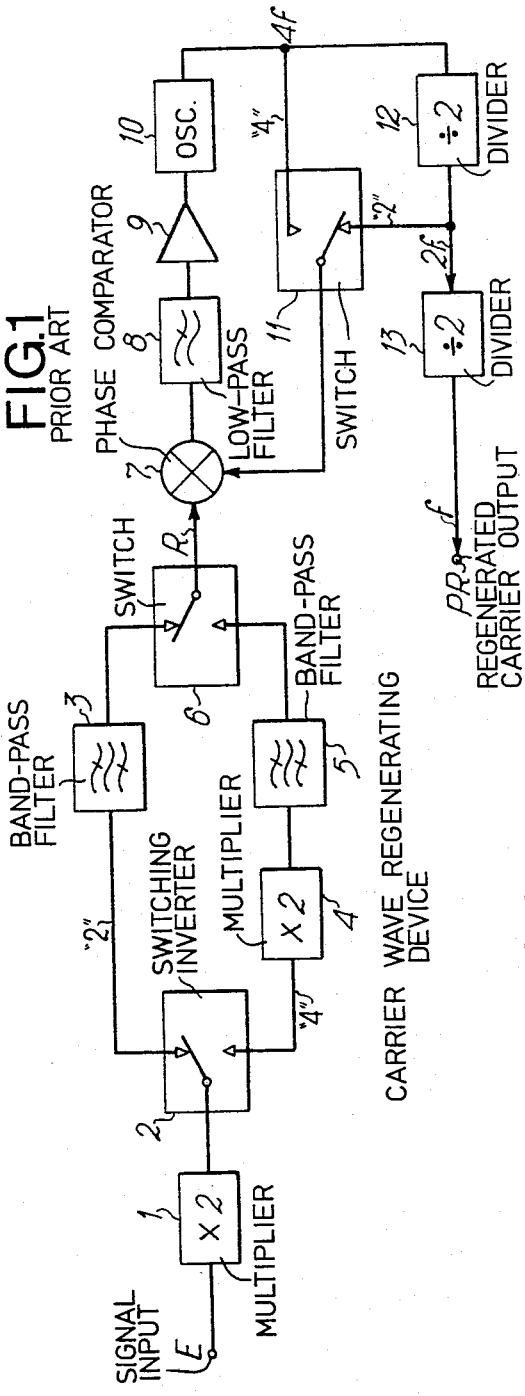
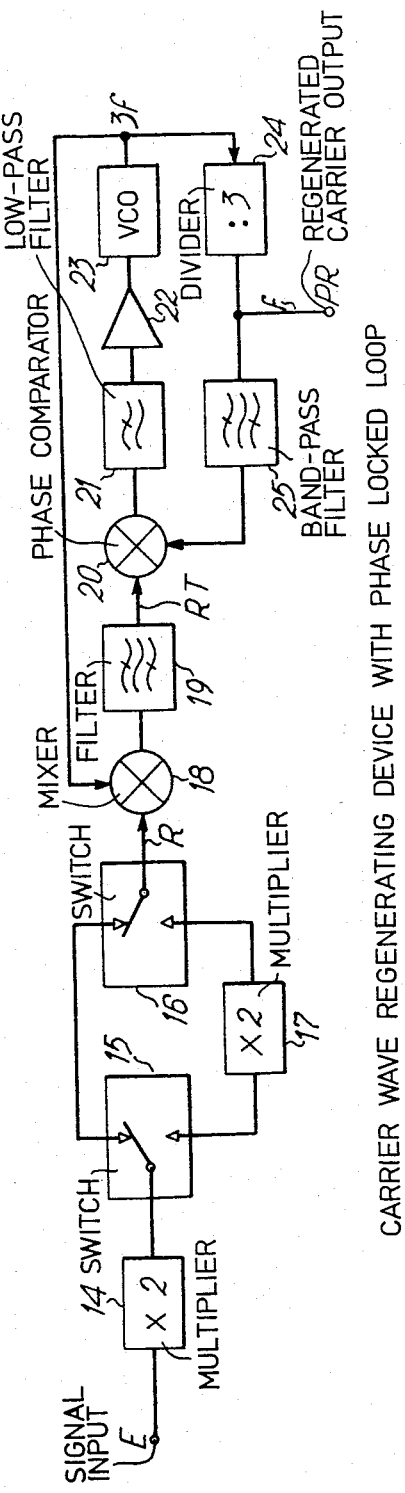

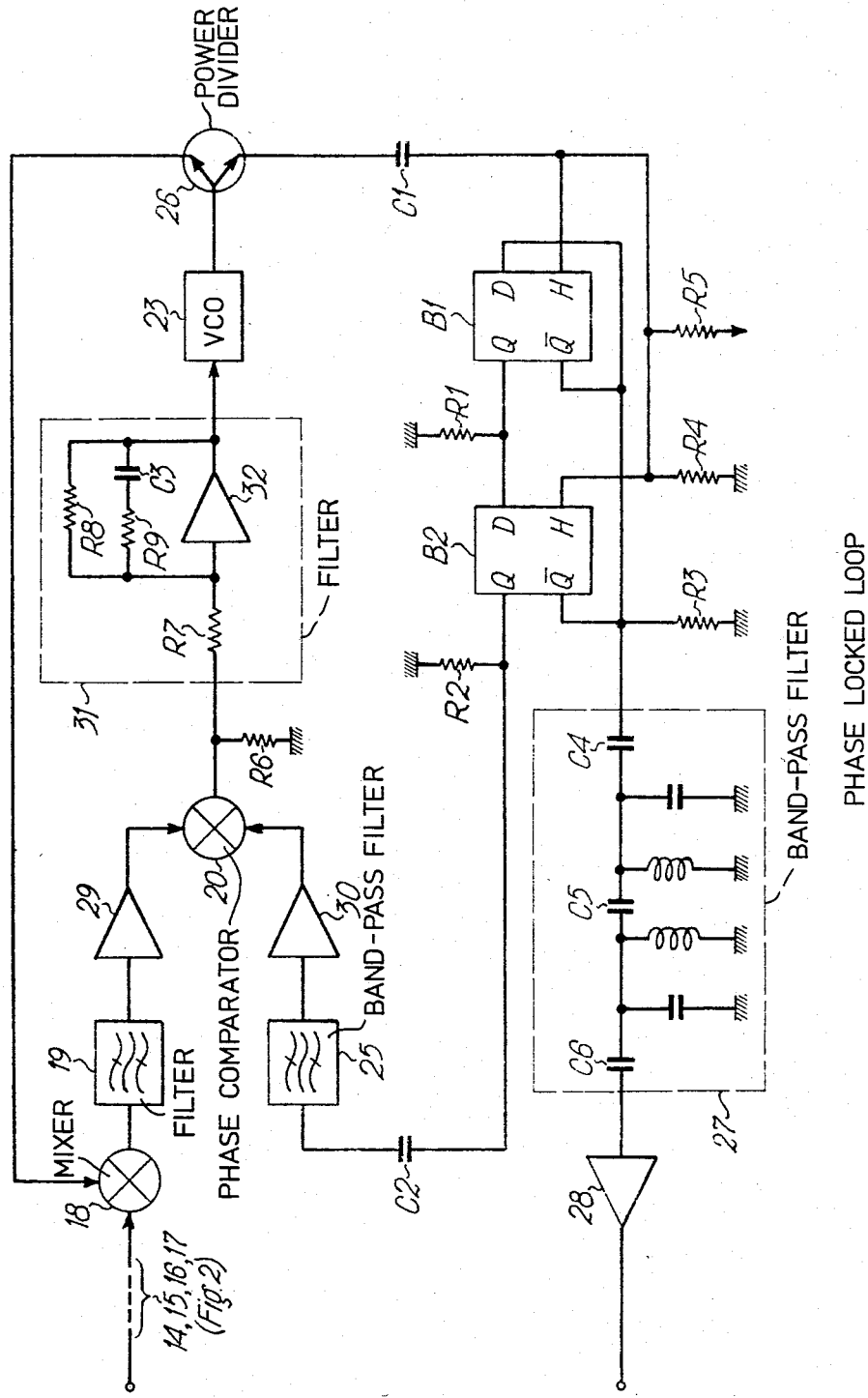

BPSK AND QPSK TRANSMISSION SYSTEMS HAVING PHASE LOCKED LOOP FOR REGENERATING THE CARRIER WAVE

The invention relates to a device comprising a phase locked loop for regenerating the carrier wave in digital information transmission systems, using binary phase shift keying (BPSK) and quadrature phase shift keying (QPSK) transmission systems.

Two-state (BPSK) or four-state (QPSK) phase-shift modulation systems are conventionally used for transmitting digital information. One of the essential components of a coherent demodulator associated therewith is adapted to regenerate the carrier wave, i.e. generate a periodic signal of a constant phase, having a frequency of the same frequency as the modulated signal. The generated signal, which is called the "regenerated carrier wave", is used as a local phase reference.

The conventional method of obtaining the regenerated carrier wave is, as follows. The signal is modulated at frequency f for a nominal frequency $f_o$, which is applied to a frequency multiplier by n, choosing n to be equal to two for a BPSK signal and equal to four for a QPSK signal. The multiplier then delivers a signal which is modulation-free since the phase jumps are $\pi$ in BPSK and $\pi/2$ in QPSK and the multiplication converts them into jumps of $2\pi$. The multiplier output signal, which will hereinafter be denoted by the more general term "reference signal", is then applied to the input of a band-pass filter centered at the frequency $nf_o$, which frees it from the accompanying noise. The output signal of the band-pass filter comprises a sinusoidal signal at frequency $nf_o$ plus a phase noise of standard deviation n $\sigma\phi$ which can be made negligible by choosing a filter having a relatively narrow pass band. The filtered signal is then applied to a frequency divider by n which delivers a signal at frequency $f_o$ accompanied by a phase noise $\sigma\phi$.

In practice, the aforementioned method of regenerating the carrier wave is difficult since, to reduce $\sigma\phi$ sufficiently, the pass band for the filter has to be made so narrow that the signal at frequency nf is also rejected as soon as frequency f deviates slightly from its rated value $f_o$. This difficulty is conventionally solved by replacing the filter with a phase locked loop. In this case, the carrier wave regenerating device comprises a local voltage-controlled oscillator having a rest frequency $nf_o$, a phase comparator one input of which receives the local oscillator output signal and the other input receives the output signal from the multiplier by n, a low-pass filter whose input receives the error signal delivered from the comparator output, and an amplifier whose input receives the filter output signal and whose output is connected to the oscillator control input. The low-pass filter eliminates much of the noise accompanying the error signal. It can be shown that a second-order locked loop comprising a first-order low-pass filter can narrowly filter the multiplier output signal while preserving a sufficient range of variation of the frequency f of the modulated signal. In general, the possible range of variation for f is limited by the loop lock range, the value of which is ten to one-hundred times as great as the equivalent noise band of the loop.

One object of the invention, in the case of a device for regenerating the carrier wave for BPSK or QPSK modulation signal, is to provide a locked loop which is supplied with a reference signal and which obviates the disadvantages of the prior art.

Another object of the invention is to provide a locked loop which operates without switching, both with a BPSK modulation signal and with a QPSK modulation signal.

One feature of the invention relates to a device for regenerating a carrier wave for a BPSK or QPSK modulation signal. The device comprises means for multiplying the received signal by two or four depending on whether the received signal has BPSK or QPSK modulation, respectively. The multiplying means delivers the reference signal. The device also comprises a locked loop having a voltage-controlled oscillator. A frequency divider has an input connected from the oscillator output and an output which is connected to the second input of a comparator. The output of the comparator is connected to the control input of the oscillator, wherein the central frequency of the oscillator is equal to three times the nominal frequency $f_o$ of the received modulated signal. The output of the oscillator is connected to one input of a mixer, the other input of which receives the reference signal and the output of which is connected to the first input of the phase comparator. The frequency divider is a divider by three to provide an output which delivers the regenerated carrier wave. Identical band-pass filters have a central frequency equal to $f_o$ which is disposed between (a) the output of the mixer and the first input of the phase comparator, and (b) between the output of the divider by three and the second input of the phase comparator.

The features of the invention mentioned hereinbefore and other features will appear more clearly from the following description of embodiments, the description being given with reference to the accompanying drawings, in which:

FIG. 1 is a block diagram of a carrier-wave regenerating device illustrating the prior art;

FIG. 2 is a block diagram of a carrier-wave regenerating device comprising a locking loop according to the invention;

FIG. 3 is a more detailed diagram of an embodiment of the locking loop in FIG. 2.

Figure 4:
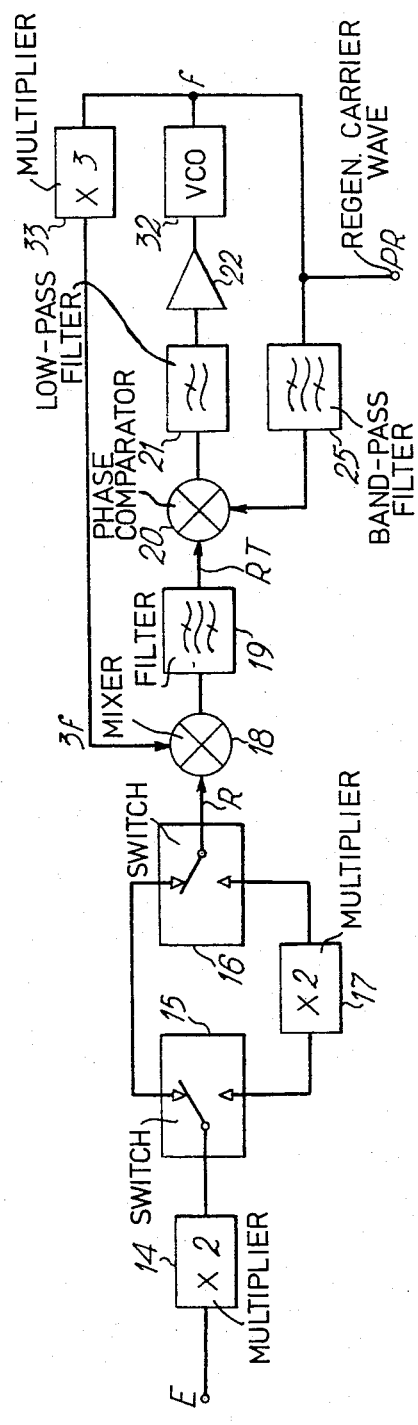
FIG. 4 is a block diagram of an alternative of the carrier-wave regenerating device in FIG. 2.

By way of example, FIG. 1 is a diagram of a carrier-wave regenerating device of use for BPSK and QPSK modulations. It comprises a multiplier by two 1 whose input is connected from the modulated signal input E, and an inverter 2 whose input is connected from the output of multiplier 1 and one output "2" of which is connected to the input of a band-pass filter 3 whereas the other output "4" is connected to the input of a multiplier by two 4. The output of multiplier 4 is connected to the input of a band-pass filter 5. The outputs of filters 3 and 5 are connected to inputs "2" and "4" respectively of a switch 6 whose output is connected to the first input of a phase comparator 7. The output of comparator 7 is connected to the input of a low-pass filter 8 whose output is connected to the input of an amplifier 9 whose output is connected to the control input of a local voltage-controlled oscillator 10. The output of oscillator 10 is connected (a) to the "4" input of a switch 11 and (b) to the input of a divider by two 12. The output of divider 12 is connected (a) to the "2" input of switch 11 and (b) to the input of a divider by two 13 whose output delivers the regenerated carrier wave.

The output of switch 11 is connected to the second input of comparator 7.

In order to process a BPSK modulation signal, switches 2, 6 and 11 are controlled by connecting their common terminal to their "2" output and vice versa, whereas in order to process a QPSK modulation signal the switches are controlled by connecting their common input to their "4" output, and vice versa.

Consequently, when the switches are in the "2" position, multiplier 1 supplies the reference signal R to the phase comparator 7 via switch 2, pass-band filter 3 and switch 6. Filter 3, which is centered around $2f_o$ and has a pass band slightly more than double the range of variation of f, i.e. $2\Delta f_{max}$, transmits the reference signal and eliminates part of the noise present at the output of multiplier 1, thus limiting the noise power at the input of phase comparator 7. The assembly comprising oscillator 10, which is voltage-controlled and has a central frequency $4f_o$, and divider by two 12 is equivalent to a voltage-controlled oscillator having a central frequency $2f_o$. We thus obtain the conventional lock loop. The divider by two 13 delivers the regenerated carrier wave.

When the switches are in the "4" position, the two multipliers 1 and 4 multiply the input signal by four and the multiplier 4 applies the reference signal R to comparator 7 via filter 5 and switch 6. The output signal of oscillator 10 is applied directly to comparator 7. The output frequency of oscillator 10 is divided by four by the two dividers 12 and 13. Filter 5 is centered at $4f_o$ and its pass band is at least equal to $8\Delta f_{max}$.

As can be seen, filters 3 and 5 are disposed in front of phase comparator 7, i.e. outside the locked loop. Consequently, the phase shift which one or the other of these filters introduces in the reference signal R affects the regenerated carrier wave. This phase shift can be estimated. For example, filter 3 introduces a delay $\tau 1$, which is approximately constant in the pass band $4\Delta f_{max}$, such that:

$$\tau 1 = \frac{2/\pi}{4\Delta f_{max}} = \frac{1}{2\pi \Delta f_{max}}$$

Signal R is, therefore, delayed by an amount $\tau_{R/S}$ equal to $\tau_1$. The resulting phase shift $\phi_{R/S}$ depends on the real deviation $\Delta f$ between frequency f and its nominal value $f_o$, such that:

$$\phi_{R/S} = 2\pi \Delta f \tau_{R/S}$$

$$\phi_{R/S} = 2\pi \Delta f \frac{1}{2\pi \Delta f_{max}}$$

$$\phi_{R/S} = \frac{\Delta f}{\Delta f_{max}}$$

In the most unfavorable case, $|\Delta f| = \Delta f_{max}$, the phase shift $|\phi_{R/S}|$ is approximately 1 radian. Such a phase error is prohibitive and there is no simple way of compensating it. Unduly selective filters, therefore, cannot be used upstream of the locked loop, since the result will be to apply a large noise power to the phase comparator. The result is a perturbation in the gain and operation of the loop. More particularly, in certain cases of digital transmission by satellite, the signal/noise ratio of the connection is very low, i.e. near unity, so that the assembly in FIG. 1 cannot be used.

In FIG. 2, the input of a multiplier by two 14 is connected to the modulated signal input E and its output is connected to the input of a switch 15 having one output connected to an input of a second switch 16 and a second output connected to the input of a second multiplier by two 17. The output of multiplier 17 is connected to the other input of switch 16. This part of the device is very similar to the device in FIG. 1, comprising multiplier 1, inverter 2, band-pass filter 5 and switch 6, but band-pass filters 3 and 5 have been eliminated. The signal delivered by switch 16 constitutes the reference signal R, which is not filtered.

The output of switch 16 is connected to the first input of a mixer 18, whose output is connected to the input of a band-pass filter 19 having a central midband $f_o$. The output of filter 19 is connected to the first input of a phase comparator 20, whose output is connected to the input of a low-pass filter 21. The output of filter 21 is connected to the input of an amplifier 22, whose output is connected to the control input of a voltage-controlled oscillator 23, whose central midband is $3f_o$. The output of oscillator 23 is connected (b) to the second input of mixer 18, and (b) to the input of a divider by three 24, whose output is connected to the input of a band-pass filter 25, whose output is connected to the second input of comparator 20. The output of divider 24 is connected to output PR, which delivers the regenerated carrier wave.

If the signal applied to input E has PBSK modulation, switches 15, 16 directly supply the output signal of multiplier 14 to the input of mixer 18, i.e. a signal at frequency 2f. Since the second input of mixer 18 receives a signal at frequency 3f, delivered by oscillator 23, it delivers inter alia a signal $R_T$ at frequency f. The band-pass filter 19 having the central midband $f_o$ has a pass band of $8\Delta f_{max}$, enabling it to select the useful beat frequency of the signal delivered by the mixer and to filter much of the noise. Band-pass filter 25 is identical with filter 19 to introduce a delay which is equal to the delay experienced by the signal delivered by mixer 18. As a result, comparator 20 accurately measures the phase shift between signal $R_T$ and the regenerated carrier wave PR, which is suitably delayed.

If the signal applied to input E has QPSK modulation, switches 15 and 16 connect multiplier 17 between multiplier 14 and mixer 18. The signal applied to the first input of mixer 18, therefore, has a frequency 4f. This signal, when mixed with the signal at frequency 3f delivered by oscillator 23, still gives a signal at frequency f at the output of 18. Downstream of mixer 18, therefore, the operation is the same as described before.

As can be shown, the locked loop comprising circuits 18–25 in FIG. 2 is equivalent to the locked loop of the device in FIG. 1, both in BPSK modulation and QPSK modulation, provided that the oscillator 23 has a gain equal to ¾ of that of prior art oscillator 10 in FIG. 1. In this demonstration, the effect of the delays of filters 19 and 25 is disregarded.

It can also be shown that if filters 19 and 25 have the minimum phase and are not too sharply tuned, i.e. if the number of poles of the equivalent low-pass transfer function is less than or equal to three, the delay which they introduce has little effect on the locking range and no influence on the other important parameters of the locking loop.

Filters 19 and 25, which are identical, are easier to construct than filters 3 and 5 of the device in FIG. 1, which are different, since the central midband of filters 19 and 25 is at least twice as weak for a given pass band.

It is thus possible to use components which have a lower quality coefficient and are, therefore, less expensive.

Since the regenerated carrier wave is taken upstream of filter 25, there is no delay due to pre-filtering between the signal applied at mixer 18 and the regenerated carrier wave. This, therefore, eliminates the catastrophic phase shift found in the prior-art devices.

Finally, there is no switch in the actual locking loop, so that the loop has the same characteristics for BPSK modulation as for QPSK modulation.

FIG. 3 shows an embodiment of the locked loop in FIG. 2, adapted to form part of a coherent demodulator for a connection via satellite in which the received signal is at the nominal frequency of 70 MHz with a deviation of ±50 kHz after transposition into an intermediate frequency. The locked loop in FIG. 3 is preceded by components 14–17 in FIG. 2, so that the signal applied to the first input of mixer 18 can be at 140 MHz for a BPSK modulation signal or 280 MHz for a QPSK modulation signal, the signals being free from phase jumps, but also being accompanied by noise having a power about ten times as great as that of the useful signal.

The second input of mixer 18 is connected to the output of oscillator 23 by a power divider 26 having two outputs. The second output of divider 26 is connected by a connecting capacitor C1 in parallel with the inputs H of two trigger circuits B1 and B2. Output Q of flip-flop circuit B1 is connected (a) to input D of flip-flop B2, and (b) to earth via a resistor R1. Output Q of flip-flop B2 is connected (a) to the input of filter 25 via a connected capacitor C2 and (b) to earth via a resistor R2. Outputs $\overline{Q}$ of flip-flops B1 and B2 are connected (a) in parallel to input D of flip-flop B1, (b) to earth via a resistor R3 and (c) to the input of a band-pass filter 27, whose output is connected to the input of a power amplifier 28. Inputs H of flip-flops B1 and B2 are polarized by a voltage divider comprising two resistors R4 and R5 connected in series between a source of polarity and earth, the common point of R4 and R5 being connected to the aforementioned inputs H.

The output of mixer 18 is connected to the input of band-pass filter 19, whose output is connected to the first input of phase comparator 20 via an amplifier 29. The output of band-pass filter 25 is connected to the second input of phase comparator 20 via an amplifier 30. The output of comparator 20 is connected (a) to earth via a ballast resistor R6, and (b) to the input of an active filter 31, whose output is connected to the voltage control input of oscillator 23.

Pass-band filters 19 and 25 are identical, as previously mentioned, and centered at 70 MHz with a pass band at 1 dB equal to 500 kHz. Amplifiers 29, 30 are also identical and have a gain of 30 dB. Flip-flops B1 and B2, together with the associated ballast resistors R1–R3 and their input resistors R4 and R5, constitute the divider by three 24 in FIG. 2. The active filter 31 comprises a series input resistor R7 connected to the inverting input of an operational amplifier 32, whose output is connected to its input (a) via a resistor R8, and (b) via a series circuit comprising a capacitor C3 and a resistor R9. Filter 31 has the following characteristics:

Constant gain, equal to 200 from frequency 0 to frequency 0.7 Hz,
Slope equal to 6 dB/octave from 0.7 Hz to 14 kHz, and
Constant gain, equal to 10 from 14 kHz.

The regenerated carrier wave PR is taken at an auxiliary output of the divider by three, i.e. the output $\overline{Q}$ of trigger B2. Band-pass filter 27 is a filter in 7, having three capacitors C4–C6 in the series branch, a capacitor C7 and an inductance L1 in the first input branch and a capacitor C8 and inductance L2 in the parallel output branch.

The power amplifier 28 has a gain of 18 dB and brings the regenerative carrier wav to the power level required by the demodulator.

FIG. 4 shows a variant of the carrier-wave regenerating device comprising circuits 14–22 in FIG. 2, connected in identical manner. The output of amplifier 22 is connected to the control input of a voltage-controlled oscillator 32, whose central frequency is $f_o$. The output of oscillator 32 is connected (a) to the input of a frequency multiplier by three 33, (b) to the input of a band-pass filter 25, and (c) to output PR which delivers the regenerated carrier wave. The output of multiplier 33 is connected to the second input of mixer 18 and the output of filter 25 is connected to the second input of phase comparator 20.

Oscillator 32 is centered at frequency $f_o$ and its output delivers a signal at frequency f. Multiplier 33, therefore, supplies mixer 18 with a signal at frequency 3f. Operation is, therefore, the same as in the device in FIG. 2.

Those who are skilled in the art will readily perceive how to modify the invention. Therefore, the appended claims are to be construed to cover all equivalent structures which fail within the true scope and spirit of the invention.

We claim:

1. A device for regenerating a carrier wave from a BPSK or QPSK modulated input signal, the device comprising means for multiplying the input signal by two or four depending on whether the input signal has BPSK or QPSK modulation, respectively, the multiplying means delivering a reference signal, the device also comprising a locked loop having a voltage-controlled oscillator, a frequency divider having an input connected to the oscillator output and further having an output connected to the second input of a phase comparator means, an output of said phase comparator means being connected to the control input of the oscillator, wherein the midband frequency of the oscillator is equal to three times the nominal frequency $f_o$ of the modulated input signal, the output of the oscillator being connected to one input of a mixer means, said mixer means having another input which receives said reference signal and further having an output connected to the first input of the phase comparator means, said frequency divider dividing by three, the output of said frequency divider delivering the regenerated carrier wave, identical band-pass filters having a central frequency equal to $f_o$ and being disposed between (a) the output of the mixer means and the first input of the phase comparator means and (b) between the output of the frequency divider and the second input of the phase comparator means, respectively.

2. A device according to claim 1, wherein identical amplifiers are connected respectively, in series between the output of each of said band-pass filters and the corresponding input of said phase comparator means.

3. A device according to claim 2, wherein the oscillator has a central frequency equal to the rated frequency $f_o$ and is followed by a frequency multiplier by three whose output is connected to the corresponding input of the mixer, the output of the oscillator delivering the regenerated carrier wave directly.

4. A device according to claim 1, wherein a low-pass filter and an amplifier are connected in series between the output of the phase comparator means and the input of the oscillator.

5. A device according to claim 2, wherein a low-pass filter and an amplifier are connected in series between the output of the phase comparator and the input of the oscillator.

6. A device according to claim 4, wherein the oscillator has a central frequency equal to the rated frequency $f_o$ and is followed by a frequency multiplier by three whose output is connected to the corresponding input of the mixer, the output of the oscillator delivering the regenerated carrier wave directly.

7. A device for regenerating a carrier wave from a BPSK or QPSK modulated input signal, the device comprising means for multiplying the input signal by two or four depending on whether the input signal has BPSK or QPSK modulation, respectively, the multiplying means delivering a reference signal, the device also comprising a locked loop having a voltage-controlled oscillator, the midband frequency of the oscillator being equal to the nominal frequency $f_o$ of the modulated input signal, a frequency multiplier having an input connected to the oscillator output and further having an output connected to out input of a mixer means, said multiplier means multiplying by three, the output of the mixer means being connected to a first input of a comparator means, an output of said phase comparator means being connected to the control input of the oscillator, the output of the oscillator also being connected to a second input of the phase comparator means, said mixer means having another input which receives said reference signal, the output of said voltage controlled oscillator delivering the regenerated carrier wave to an output terminal, identical band-pass filters having a central frequency equal to $f_o$ and being disposed between (a) the output of the mixer means and the first input of the phase comparator means and (b) between the output of the voltage controlled oscillator and the second input of the phase comparator means, respectively.

8. A device according to claim 7, wherein a low-pass filter and an amplifier are connected in series between the output of the phase comparator means and the input of the oscillator.

* * * * *